US011005538B2

(12) United States Patent
Abedini et al.

(10) Patent No.: US 11,005,538 B2
(45) Date of Patent: May 11, 2021

(54) MILLIMETER WAVE REPEATER

(71) Applicant: QUALCOMM Incorporated, San Diego, CA (US)

(72) Inventors: Navid Abedini, Somerset, NJ (US); Junyi Li, Chester, NJ (US); Raju Hormis, New York, NY (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/703,390

(22) Filed: Dec. 4, 2019

(65) Prior Publication Data
US 2020/0195310 A1 Jun. 18, 2020

Related U.S. Application Data

(60) Provisional application No. 62/779,804, filed on Dec. 14, 2018.

(51) Int. Cl.
*H04B 7/026* (2017.01)
*H04B 7/06* (2006.01)

(52) U.S. Cl.
CPC .......... *H04B 7/026* (2013.01); *H04B 7/0617* (2013.01)

(58) Field of Classification Search
CPC .... H04B 7/026; H04B 7/0456; H04B 7/0617; H04B 7/14
USPC ..... 455/7, 11.1, 69, 522; 370/315, 329, 337; 375/269; 725/126
See application file for complete search history.

(56) References Cited

U.S. PATENT DOCUMENTS

| 7,233,771 | B2 | 6/2007 | Proctor, Jr. et al. |
| 8,971,796 | B2 | 3/2015 | Judd et al. |
| 10,244,579 | B2* | 3/2019 | Pi ........................... H04W 88/10 |
| 10,608,729 | B1* | 3/2020 | Youtz ................... H04B 7/0486 |
| 2004/0139477 | A1* | 7/2004 | Russell .............. H04N 21/6112 |
| | | | 725/126 |
| 2007/0064830 | A1* | 3/2007 | Choi .................... H04B 7/0634 |
| | | | 375/267 |

(Continued)

FOREIGN PATENT DOCUMENTS

| EP | 2795959 B1 | 7/2016 |
| KR | 20180087148 A | 8/2018 |

OTHER PUBLICATIONS

Co-pending U.S. Appl. No. 62/848,929, filed May 16, 2019.
(Continued)

*Primary Examiner* — Tan H Trinh
(74) *Attorney, Agent, or Firm* — Harrity & Harrity, LLP

(57) ABSTRACT

Various aspects of the present disclosure generally relate to wireless communication. In some aspects, a millimeter wave repeater may communicate with a base station using a first set of antennas and a first beamforming configuration for the first set of antennas, the first beamforming configuration being selected from a beamforming codebook that includes multiple beamforming configurations; and communicate with one or more user equipments (UEs) using a second set of antennas and a second beamforming configuration for the second set of antennas, the second beamforming configuration being a fixed configuration that does not change for different communications between the second set of antennas and the one or more UEs. Numerous other aspects are provided.

30 Claims, 8 Drawing Sheets

(56) References Cited

U.S. PATENT DOCUMENTS

| | | | | |
|---|---|---|---|---|
| 2013/0017855 A1* | 1/2013 | Hui | | H04W 16/28 |
| | | | | 455/522 |
| 2014/0247818 A1* | 9/2014 | Lopez | | H04B 7/0617 |
| | | | | 370/337 |
| 2015/0372740 A1* | 12/2015 | Ko | | H04B 7/0469 |
| | | | | 370/329 |
| 2016/0050006 A1* | 2/2016 | Ko | | H04L 1/20 |
| | | | | 370/329 |
| 2016/0360425 A1* | 12/2016 | Huang | | H01Q 1/246 |
| 2017/0141826 A1* | 5/2017 | Kim | | H04W 72/06 |
| 2017/0338875 A1* | 11/2017 | Berglund | | H04B 7/0695 |
| 2017/0347391 A1* | 11/2017 | Tenny | | H04W 84/18 |
| 2017/0366242 A1* | 12/2017 | Lee | | H04B 7/0408 |
| 2018/0115958 A1* | 4/2018 | Raghavan | | H04W 4/50 |
| 2018/0205435 A1* | 7/2018 | Nair | | H04B 7/0615 |
| 2018/0227022 A1* | 8/2018 | Kim | | H04B 7/0617 |
| 2018/0234157 A1* | 8/2018 | Liang | | H04B 7/15507 |
| 2019/0020401 A1* | 1/2019 | Gharavi | | H04B 7/0413 |
| 2019/0028177 A1* | 1/2019 | Feng | | H04W 72/0413 |
| 2019/0173537 A1* | 6/2019 | Cai | | H04W 16/28 |
| 2019/0181940 A1* | 6/2019 | Liang | | H04B 7/0695 |
| 2019/0296821 A1* | 9/2019 | Choi | | H04B 7/0617 |
| 2019/0335344 A1* | 10/2019 | Lopez-Perez | | H04W 16/28 |
| 2020/0099418 A1* | 3/2020 | Rofougaran | | H04W 24/10 |
| 2020/0145093 A1* | 5/2020 | Cheng | | H04B 7/1555 |

OTHER PUBLICATIONS

Partial International Search Report—PCT/US2019/064629—ISA/EPO—dated Feb. 24, 2020.

Tsinos C.G., et al., "Hybrid Analog-Digital Transceiver Designs for mmWave Amplify-and-Forward Relaying Systems", 2018 41st International Conference on Telecommunications and Signal Processing (TSP), IEEE, Jul. 4, 2018 (Jul. 4, 2018), pp. 1-6, XP033389752, DOI: 10.1109/TSP.2018.8441203 [retrieved on Aug. 20, 2018] p. 446-447.

International Search Report and Written Opinion—PCT/US2019/064629—ISA/EPO—Jun. 24, 2020.

* cited by examiner

MILLIMETER WAVE REPEATER

CROSS-REFERENCE TO RELATED APPLICATION

This application claims priority to U.S. Provisional Patent Application No. 62/779,804, filed on Dec. 14, 2018, entitled "MILLIMETER WAVE REPEATER," which is hereby expressly incorporated by reference herein.

FIELD OF THE DISCLOSURE

Aspects of the present disclosure generally relate to wireless communication and to techniques and apparatuses for a millimeter wave repeater.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipments to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a millimeter wave repeater, may include communicating with a base station using a first set of antennas and a first beamforming configuration for the first set of antennas, the first beamforming configuration being selected from a beamforming codebook that includes multiple beamforming configurations; and communicating with one or more UEs using a second set of antennas and a second beamforming configuration for the second set of antennas, the second beamforming configuration being a fixed configuration that does not change for different communications between the second set of antennas and the one or more UEs.

In some aspects, a millimeter wave repeater for wireless communication may include memory and one or more processors operatively coupled to the memory. The memory and the one or more processors may be configured to communicate with a base station using a first set of antennas and a first beamforming configuration for the first set of antennas, the first beamforming configuration being selected from a beamforming codebook that includes multiple beamforming configurations; and communicate with one or more UEs using a second set of antennas and a second beamforming configuration for the second set of antennas, the second beamforming configuration being a fixed configuration that does not change for different communications between the second set of antennas and the one or more UEs.

In some aspects, a non-transitory computer-readable medium may store one or more instructions for wireless communication. The one or more instructions, when executed by one or more processors of a millimeter wave repeater, may cause the one or more processors to communicate with a base station using a first set of antennas and a first beamforming configuration for the first set of antennas, the first beamforming configuration being selected from a beamforming codebook that includes multiple beamforming configurations; and communicate with one or more UEs using a second set of antennas and a second beamforming configuration for the second set of antennas, the second beamforming configuration being a fixed configuration that does not change for different communications between the second set of antennas and the one or more UEs.

In some aspects, an apparatus for wireless communication may include means for communicating with a base station using a first set of antennas and a first beamforming configuration for the first set of antennas, the first beamforming configuration being selected from a beamforming codebook that includes multiple beamforming configurations; and means for communicating with one or more UEs using a second set of antennas and a second beamforming configuration for the second set of antennas, the second beamforming configuration being a fixed configuration that does not change for different communications between the second set of antennas and the one or more UEs.

In some aspects, a method of wireless communication, performed by a base station, may include receiving, via a communication interface that uses a wireless communication technology other than millimeter wave, a report from a millimeter wave repeater regarding multiple sets of antennas included in the millimeter wave repeater; determining a beamforming configuration for a first set of antennas of the millimeter wave repeater based at least in part on the report and based at least in part on a beamforming codebook that includes multiple beamforming configurations for the first set of antennas, the first set of antennas to be used for wireless backhaul communications between the base station and the millimeter wave repeater; and indicating the beamforming configuration to the millimeter wave repeater.

In some aspects, a base station for wireless communication may include memory and one or more processors operatively coupled to the memory. The memory and the one or more processors may be configured to receive, via a communication interface that uses a wireless communication technology other than millimeter wave, a report from a millimeter wave repeater regarding multiple sets of antennas included in the millimeter wave repeater; determine a beamforming configuration for a first set of antennas of the millimeter wave repeater based at least in part on the report and based at least in part on a beamforming codebook that includes multiple beamforming configurations for the first set of antennas, the first set of antennas to be used for wireless backhaul communications between the base station and the millimeter wave repeater; and indicate the beamforming configuration to the millimeter wave repeater.

In some aspects, a non-transitory computer-readable medium may store one or more instructions for wireless communication. The one or more instructions, when executed by one or more processors of a base station, may cause the one or more processors to receive, via a communication interface that uses a wireless communication technology other than millimeter wave, a report from a millimeter wave repeater regarding multiple sets of antennas included in the millimeter wave repeater; determine a beamforming configuration for a first set of antennas of the millimeter wave repeater based at least in part on the report and based at least in part on a beamforming codebook that includes multiple beamforming configurations for the first set of antennas, the first set of antennas to be used for wireless backhaul communications between the base station and the millimeter wave repeater; and indicate the beamforming configuration to the millimeter wave repeater.

In some aspects, an apparatus for wireless communication may include means for receiving, via a communication interface that uses a wireless communication technology other than millimeter wave, a report from a millimeter wave repeater regarding multiple sets of antennas included in the millimeter wave repeater; means for determining a beamforming configuration for a first set of antennas of the millimeter wave repeater based at least in part on the report and based at least in part on a beamforming codebook that includes multiple beamforming configurations for the first set of antennas, the first set of antennas to be used for wireless backhaul communications between the apparatus and the millimeter wave repeater; and means for indicating the beamforming configuration to the millimeter wave repeater.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
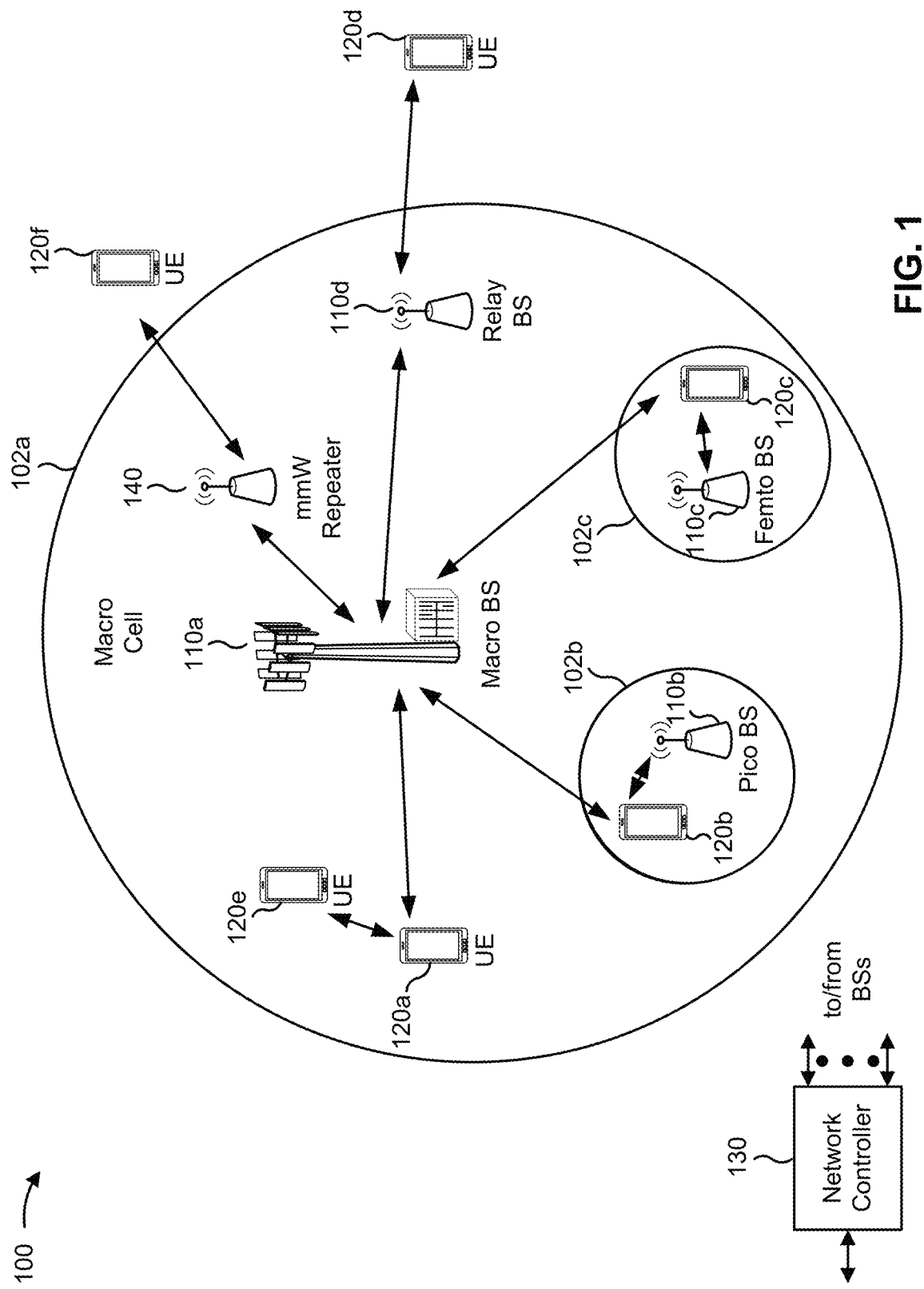
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with UEs and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e, 120f, and/or the like) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a millimeter wave (mmW) repeater 140 may receive an analog millimeter wave signal from a base station 110, may amplify the analog millimeter wave signal, and may transmit the amplified millimeter wave signal to one or more UEs 120 (e.g., shown as UE 120*f*). In some aspects, the mmW repeater 140 may be an analog mmW repeater, sometimes also referred to as a layer 1 mmW repeater. Additionally, or alternatively, the mmW repeater 140 may be a wireless transmit receive point (TRP) acting as a distributed unit (e.g., of a 5G access node) that communicates wirelessly with a base station 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 140 may be reduced. Additional details regarding mmW repeater 140 are provided elsewhere herein.

As indicated above, FIG. 1 is provided as an example. Other examples may differ from what is described with regard to FIG. 1.

Figure 2:
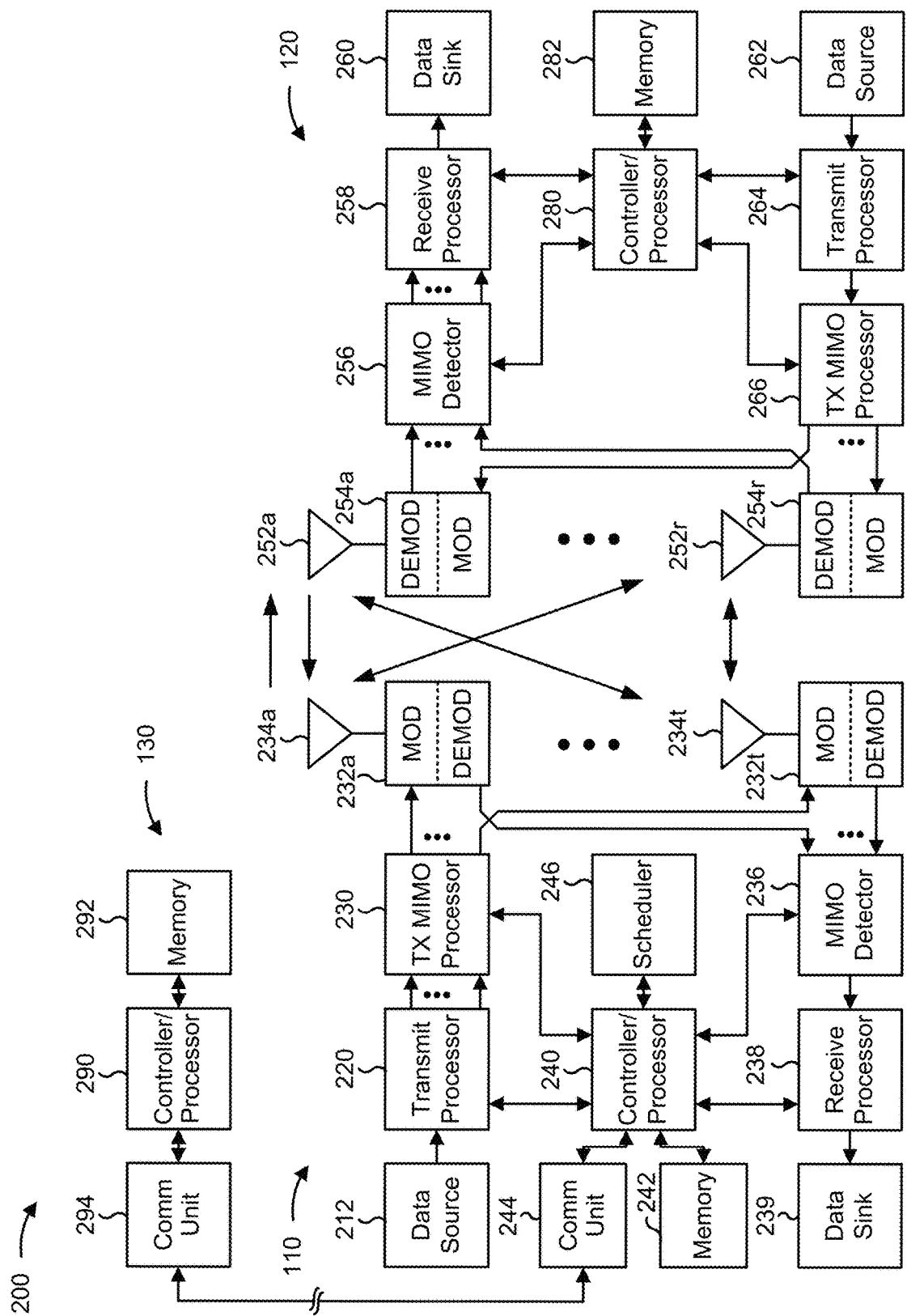
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor (e.g., controller/processor 280 or another processor) may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with communicating with and/or configuring an analog millimeter wave repeater, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, base station 110 may include means for receiving, via a communication interface that uses a wireless communication technology other than millimeter wave, a report from a millimeter wave repeater regarding multiple sets of antennas included in the millimeter wave repeater; means for determining a beamforming configuration for a first set of antennas of the millimeter wave repeater based at least in part on the report and based at least in part on a beamforming codebook that includes multiple beamforming configurations for the first set of antennas, the first set of antennas to be used for wireless backhaul communications between the base station 110 and the millimeter wave repeater; means for indicating the beamforming configuration to the millimeter wave repeater; and/or the like. In some aspects, such means may include one or more components of base station 110 described in connection with FIG. 2.

As indicated above, FIG. 2 is provided as an example. Other examples may differ from what is described with regard to FIG. 2.

Figure 3:
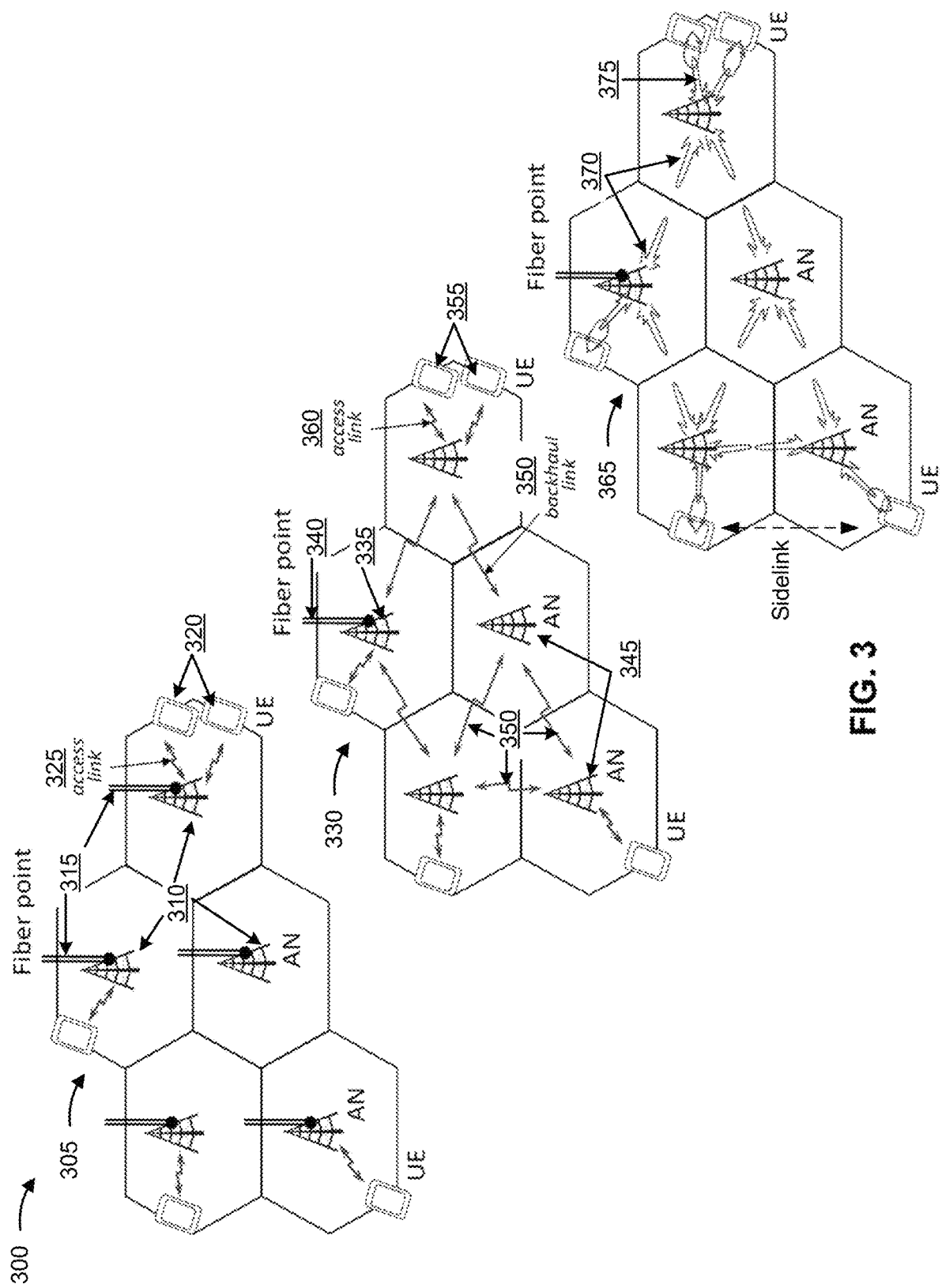
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

In some aspects, an IAB network may support a multi-hop wireless backhaul. Additionally, or alternatively, nodes of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
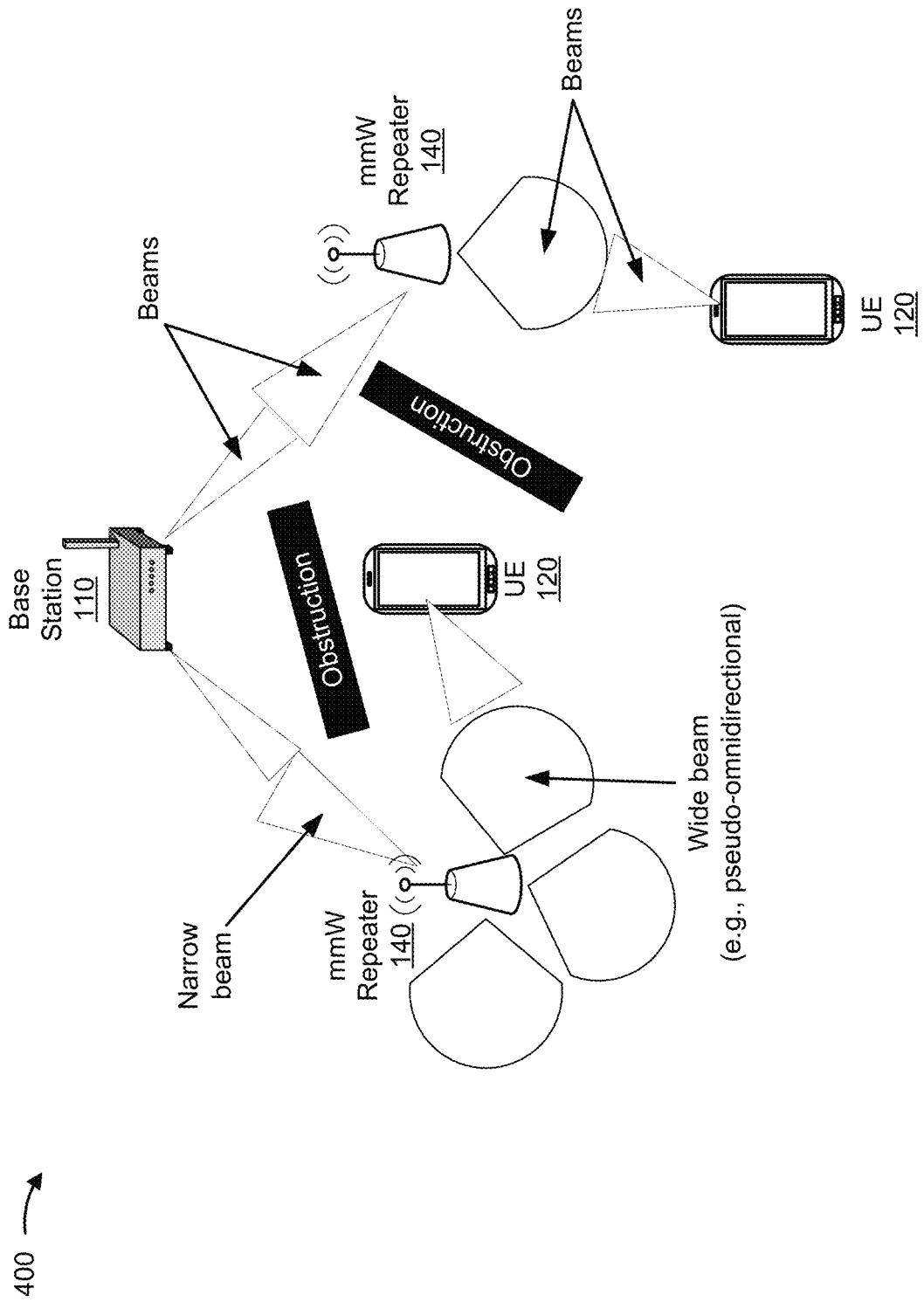
FIG. 4 is a diagram illustrating an example of communicating using an analog millimeter wave repeater, in accordance with various aspects of the present disclosure.

FIG. 4 is a diagram illustrating an example 400 of communicating using an analog millimeter wave repeater, in accordance with various aspects of the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 110, to extend coverage to UEs 120 without line of sight to the base station 110 (e.g., due to an obstruction), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 4, a millimeter wave repeater 140 may perform directional communication by using beamforming to communicate with a base station 110 via a first beam (e.g., a backhaul beam over a backhaul link with the base station 110) and to communicate with a UE 120 via a second beam (e.g., an access beam over an access link with the UE 120). To achieve long propagation distances and/or to satisfy a required link budget, the millimeter wave repeater may use narrow beams (e.g., with a beamwidth less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine the best beam), beam maintenance (e.g., to find the best beam as conditions change due to mobility and/or the like), beam management, and/or the like. This may waste resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 110. As shown in FIG. 4, the millimeter wave repeater 140 may use a narrower beam to communicate with the base station 110 without unnecessarily consuming network resources and/or resources of the millimeter wave repeater 140 because the need for beam training, beam maintenance, and/or beam management may be limited, due to limited or no mobility of the base station 110 and the millimeter wave repeater 140 (and/or due to a line of sight communication path between the base station 110 and the millimeter wave repeater 140).

As further shown in FIG. 4, the millimeter wave repeater 140 may use a wider beam (e.g., a pseudo-omnidirectional beam and/or the like) to communicate with one or more UEs 120. This wider beam may provide wider coverage for access links, thereby providing coverage to mobile UEs 120 without requiring frequent (or any) beam training, beam maintenance, and/or beam management of beams of the millimeter wave repeater 140 and/or of beams of the UEs 120 (e.g., because the wider beam may be fixed or may not need to track individual UEs 120). In this way, network resources and/or resources of the millimeter wave repeater 140 may be conserved. Furthermore, if the millimeter wave repeater 140 does not include digital signal processing capabilities, resources of the base station 110 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 110 and the millimeter wave repeater 140.

In this way, the millimeter wave repeater 140 may increase a coverage area, provide access around obstructions (as shown), and/or the like, while conserving resources of the base station 110, resources of the millimeter wave repeater 140, network resources, and/or the like. Additional details are described below.

As indicated above, FIG. 4 is provided as an example. Other examples may differ from what is described with regard to FIG. 4.

Figure 5:
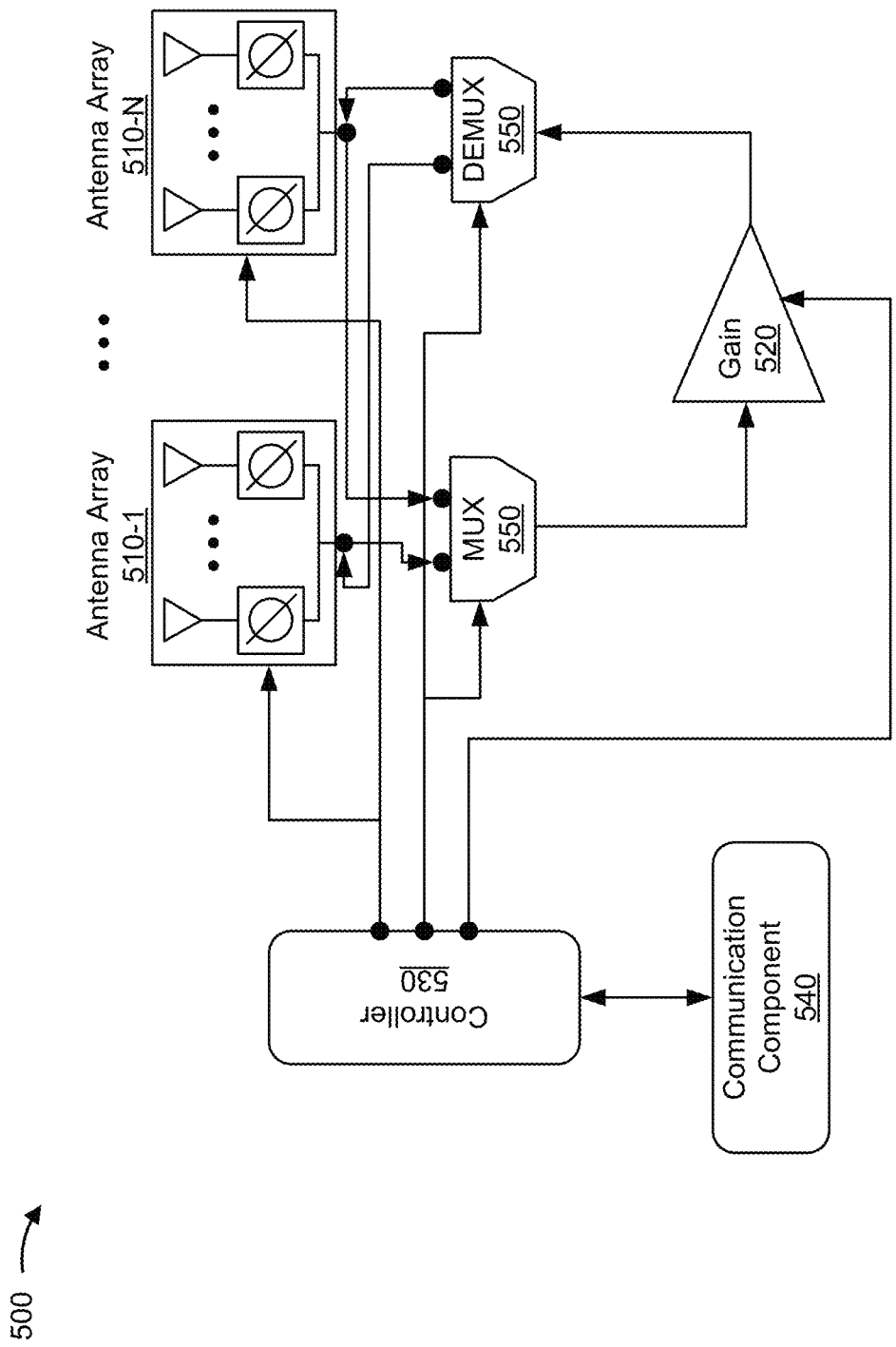
FIG. 5 is a diagram illustrating an example millimeter wave repeater, in accordance with various aspects of the present disclosure.

FIG. 5 is a diagram illustrating an example of a millimeter wave repeater 500, in accordance with various aspects of the present disclosure. In some aspects, millimeter wave repeater 500 may correspond to millimeter wave repeater 140 shown in FIG. 1 and FIG. 4.

As shown in FIG. 5, the millimeter wave repeater 500 may include one or more antenna arrays 510-1 through 510-N (N>1), a gain component 520 (shown as "Gain"), a controller 530, a communication component 540, and a multiplexer (MUX) and/or demultiplexer (DEMUX) (MUX/DEMUX) 550.

An antenna array 510 includes multiple antenna elements capable of being configured for beamforming. For example, an antenna array 510 may be referred to as a phased array because phase values and/or phase offsets of the antenna elements may be configured to form a beam, with different phase values and/or phase offsets being used for different beams (e.g., in different directions). In some aspects, an antenna array 510 may be a fixed receive (RX) antenna array capable of only receiving communications, and not transmitting communications. In some aspects, an antenna array 510 may be a fixed transmit (TX) antenna array capable of only transmitting communications, and not receiving communications. In some aspects, an antenna array 510 may be capable of being configured to act as an RX antenna array or a TX antenna array (e.g., via a TX/RX switch, a MUX/DEMUX, and/or the like). The antenna arrays 510 may be capable of communicating using millimeter waves.

Gain component 520 includes a component capable of amplifying an input signal and outputting an amplified signal. For example, gain component 520 may include a power amplifier, a variable gain component, and/or the like. In some aspects, gain component 520 may have variable gain control. The gain component 520 may connect to (e.g., couple with) an RX antenna array (e.g., a first antenna array 510-1) and a TX antenna array (e.g., a second antenna array 510-2) such that an analog millimeter wave signal, received via the RX antenna array, can be amplified by the gain component 520 and output to the TX antenna array for transmission. In some aspects, the level of amplification of the gain component 520 may be controlled by the controller 530.

Controller 530 includes a component capable of controlling one or more other components of the millimeter wave repeater 500. For example, the controller 530 may include a controller, a microcontroller, a processor, and/or the like. In some aspects, the controller 530 may control the gain component 520 by controlling a level of amplification or gain applied by the gain component 520 to an input signal. Additionally, or alternatively, the controller 530 may control an antenna array 510 by controlling a beamforming configuration for the antenna array 510 (e.g., one or more phase values for the antenna array 510, one or more phase offsets for the antenna array 510, one or more power parameters for the antenna array 510, one or more beamforming parameters for the antenna array 510, a TX beamforming configuration, an RX beamforming configuration, and/or the like), by controlling whether the antenna array 510 acts as an RX antenna array or a TX antenna array (e.g., by configuring interaction and/or connections between the antenna array 510 and a MUX/DEMUX 550), and/or the like. Additionally, or alternatively, the controller 530 may power on or power off one or more components of millimeter wave repeater 500 (e.g., when a base station 110 does not need to use the millimeter wave repeater to serve UEs 120). In some aspects, the controller 530 may control a timing of one or more of the above configurations.

Communication component 540 may include a component capable of wirelessly communicating with a base station 110 using a wireless technology other than millimeter wave. For example, the communication component 540 may communicate with the base station 110 using a personal area network (PAN) technology (e.g., Bluetooth, Bluetooth Low Energy (BLE), and/or the like), a 4G or LTE radio access technology, a narrowband Internet of Things (NB-IoT) technology, a sub-6 GHz technology, a visible light communication technology, and/the like. In some aspects, the communication component 540 may use a lower frequency communication technology, and an antenna array 510 may use a higher frequency communication technology (e.g., millimeter wave and/or the like). In some aspects, an antenna array 510 may be used to transfer data between the millimeter wave repeater 500 and the base station 110, and the communication component 540 may be used to transfer control information between the millimeter wave repeater 500 and the base station 110 (e.g., a report, a configuration, instructions to power on or power off one or more components, and/or the like).

MUX/DEMUX 550 may be used to multiplex and/or demultiplex communications received from and/or transmitted to an antenna array 510. For example, MUX/DEMUX 550 may be used to switch an RX antenna array to a TX antenna array. In some aspects, MUX/DEMUX 550 may be used to reverse the beamforming as received by one antenna array to retrieve an analog signal corresponding to transmitted information, and to apply beamforming based on the configuration of another antenna array.

In some aspects, the millimeter wave repeater 500 does not include any components for digital signal processing. For example, the millimeter wave repeater 500 may not include a digital signal processor, a baseband processor, a digital-to-analog converter (DAC), an analog-to-digital converter (ADC), and/or the like. In this way, a cost to produce the millimeter wave repeater 500 may be reduced. Furthermore, latency may be reduced by eliminating digital processing of received millimeter wave signals prior to transmission of corresponding amplified millimeter wave signals.

In some aspects, one or more antenna arrays 510, gain component 520, controller 530, communication component 540, MUX/DEMUX 550, and/or the like may perform one or more techniques associated with communicating with and/or configuring an analog millimeter wave repeater, as described in more detail elsewhere herein. For example, one or more components of millimeter wave repeater 500 may perform or direct operations of, for example, process 700 of FIG. 7, process 800 of FIG. 8, and/or other processes as described herein.

In some aspects, millimeter wave repeater 500 may include means for communicating with a base station using a first set of antennas and a first beamforming configuration for the first set of antennas, the first beamforming configuration being selected from a beamforming codebook that includes multiple beamforming configurations; means for communicating with one or more user equipments (UEs) using a second set of antennas and a second beamforming configuration for the second set of antennas, the second beamforming configuration being a fixed configuration that does not change for different communications between the second set of antennas and the one or more UEs; and/or the like. In some aspects, such means may include one or more components of millimeter wave repeater 500 described in connection with FIG. 5.

As indicated above, FIG. 5 is provided as an example. Other examples may differ from what is described with regard to FIG. 5. For example, millimeter wave repeater 500 may include additional components, fewer components, different components, or differently arranged components than those shown in FIG. 5. Furthermore, two or more components shown in FIG. 5 may be implemented within a single component, or a single component shown in FIG. 5 may be implemented as multiple components. Additionally, or alternatively, a set of components (e.g., one or more components) of millimeter wave repeater 500 may perform one or more functions described as being performed by another set of components of millimeter wave repeater 500.

Figure 6:
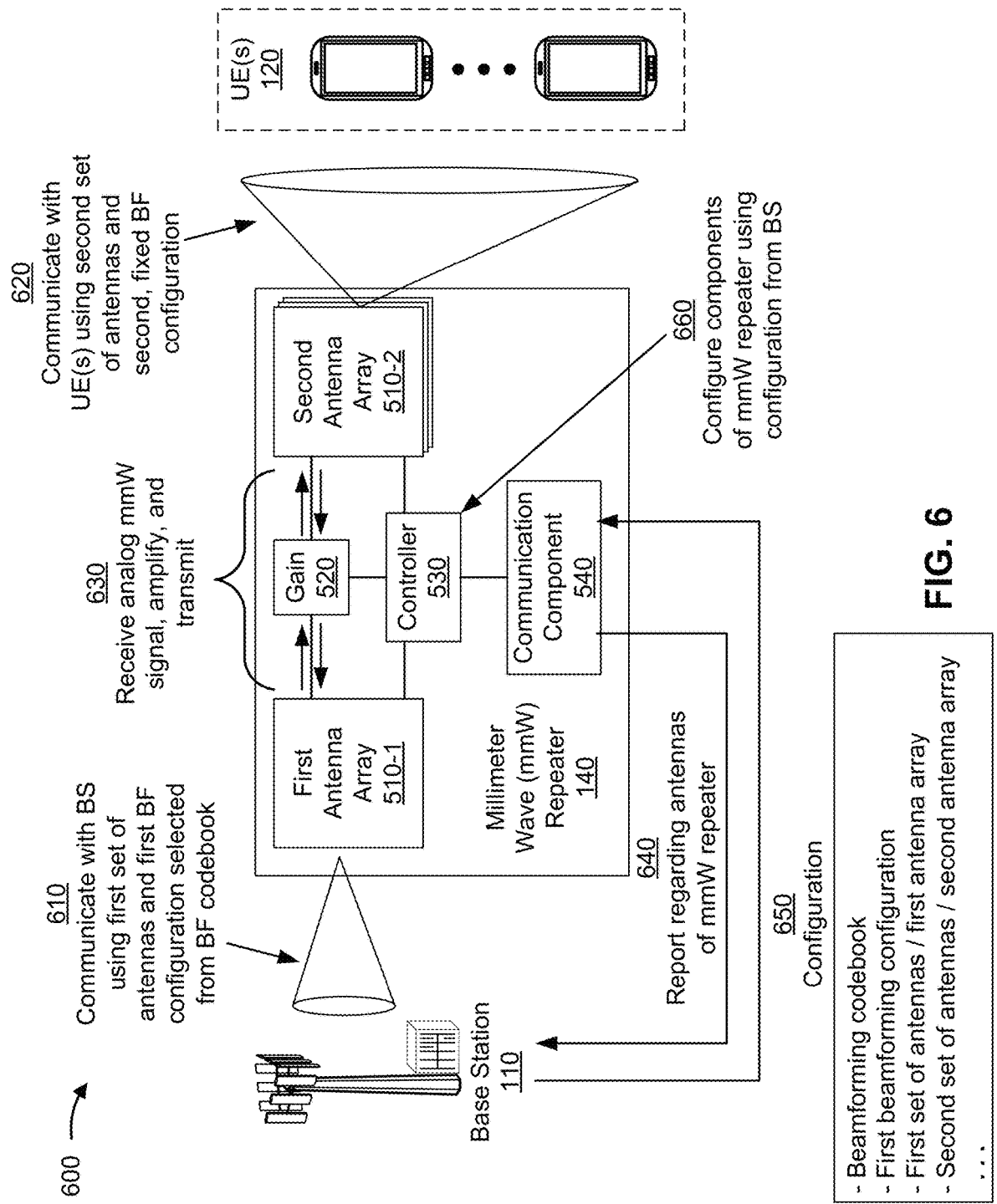
FIG. 6 is a diagram illustrating an example of communicating using an analog millimeter wave repeater, in accordance with various aspects of the present disclosure.

FIG. 6 is a diagram illustrating an example 600 of communicating using an analog millimeter wave repeater, in accordance with various aspects of the present disclosure.

As shown in FIG. 6, a millimeter wave repeater 140 may communicate with a base station 110 using a first set of antennas, shown as a first antenna array 510-1, and may communicate with a set of UEs 120 (e.g., one or more UEs 120) using a second set of antennas, shown as a second antenna array 510-2. In some aspects, the millimeter wave repeater 140 may correspond to the millimeter wave repeater 500 described above in connection with FIG. 5.

As shown by reference number 610, the first antenna array 510-1 may communicate with the base station 110 using a first beamforming (BF) configuration selected from a beamforming codebook. The beamforming codebook from which the first beamforming configuration is selected may include multiple entries corresponding to multiple beamforming configurations, and one of the entries may be selected for the first beamforming configuration. The first beamforming configuration may be used to configure the first antenna array 510-1, such as by configuring a beam (e.g., a backhaul beam) used by the first antenna array 510-1, one or more beam parameters of the beam, one or more phase values for antenna elements of the first antenna array 510-1, one or more phase offsets for the antenna elements, one or more power parameters (e.g., a transmit power) for the antenna elements, and/or the like.

As shown by reference number 620, the second antenna array 510-2 may communicate with the one or more UEs 120 using a second beamforming configuration. The second beamforming configuration may be a fixed configuration for communications between the second antenna array 510-2 and the one or more UEs 120. Thus, in some aspects, the second beamforming configuration does not change for different communications between the second antenna array 510-2 and the one or more UEs 120. In other words, the second antenna array 510-2 may always use the same beamforming configuration for access beams. In some aspects, if the second antenna array 510-2 is reconfigured to communicate with the base station 110 (e.g., using a backhaul beam) rather than one or more UEs 120 (e.g., rather than using an access beam), then the second antenna array 510-2 may be capable of using a beam configuration that is not fixed for backhaul communications. The second beamforming configuration may be used to configure (e.g., may specify various aspects of) the second antenna array 510-2, such as by configuring or specifying a beam (e.g., an access beam) used by the second antenna array 510-2, one or more beam parameters of the beam, one or more phase values for antenna elements of the second antenna array 510-2, one or more phase offsets for the antenna elements, one or more power parameters (e.g., a transmit power) for the antenna elements, and/or the like.

In some aspects, the second beamforming configuration is a fixed configuration that is not selected from a beamforming codebook. For example, the second beamforming configuration for the second antenna array 510-2 may be hard coded in memory of the millimeter wave repeater 140, where the millimeter wave repeater 140 is not capable of overwriting the second beamforming configuration. Additionally, or alternatively, the second beamforming configuration may be selected from a beamforming codebook that includes only a single entry corresponding to the second beamforming configuration, such that the millimeter wave repeater 140 and/or the base station 110 cannot select a beamforming configuration, for the second antenna array 510-2, other than the second beamforming configuration.

In some aspects, the first beamforming configuration may configure a narrower beam than the second beamforming configuration. Additionally, or alternatively, the first beamforming configuration may configure a beam with a beamwidth that is less than or equal to a threshold. This may permit the millimeter wave repeater 140 and the base station 110 to communicate using millimeter waves over a longer distance using a narrower beam (e.g., as compared to a wider beam) without consuming a large amount of network resources, base station resources, and/or millimeter wave repeater resources to perform various beam procedures (e.g., beam training, beam re-training, beam maintenance, beam management, and/or the like) because the base station 110 and the millimeter wave repeater 140 may be deployed in fixed locations (or with limited mobility). Because of the fixed locations, the same beam can be used for communications between the base station 110 and the millimeter wave repeater 140 for a long time period (e.g., until one of those devices is moved, until an obstruction occurs, and/or the like). In some aspects, if the base station 110 and the millimeter wave repeater 140 perform beam procedures, those procedures may be performed less often (e.g., with a lower periodicity) than would otherwise be needed in a mobility scenario, thereby conserving network resources, base station resources, and/or millimeter wave repeater resources.

In some aspects, the second beamforming configuration may configure or specify a wider beam than a beam configured or specified by the first beamforming configuration. Additionally, or alternatively, the second beamforming configuration may configure or specify a beam with a beamwidth that is greater than or equal to a threshold. In some aspects, the second beamforming configuration may configure or specify a pseudo-omnidirectional beam (e.g., which radiates substantially equal radio power in substantially all directions perpendicular to an axis or in all directions along an angle of communication, with power varying based on an angle to the axis and declining to zero power on the axis). This may permit the millimeter wave repeater 140 to communicate with a greater number of UE(s) 120 and/or to maintain communications as those UE(s) 120 move, due to a wider beamwidth. While those communications may be supported over a shorter distance using the wider beam (e.g., as compared to a narrower beam), the millimeter wave repeater 140 may be deployed such that the shorter distance is sufficient to provide extended coverage and/or coverage for obstructed UEs 120 (e.g., UEs 120 that are completely or partially obstructed from communicating with the base station 110, UEs 120 that do not have a line of sight path to the base station 110, and/or the like). Furthermore, since a wider beam provides wider coverage, beam procedures may be performed less often (or not at all) for the second antenna array 510-2 as compared to using a narrower beam, thereby conserving network resource, base station resources, and/or millimeter wave repeater resources needed to perform such beam procedures.

In some aspects, the second beamforming configuration may configure or specify a narrow beam with a beamwidth that is less than or equal to a threshold. For example, when the millimeter wave repeater 140 is deployed to provide coverage to an obstructed area and/or a gap in coverage that is narrow and/or long, such as a tunnel, a hallway, and/or the like, the second beam configuration may configure or specify a narrow beam to provide coverage in such an area. Such a narrow beam may be wider or narrower than a beam specified by the first beamforming configuration.

As shown by reference number 630, the millimeter wave repeater 140 may receive an analog millimeter wave signal via one of the first set of antennas or the second set of antennas, may amplify the analog millimeter wave signal (e.g., using gain component 520, which may be controlled by controller 530), and may transmit the amplified analog millimeter wave signal via the other of the first set of antennas or the second set of antennas. In some aspects, the millimeter wave repeater 140 may receive, amplify, and transmit the analog millimeter wave signal without performing analog-to-digital conversion, as described above in connection with FIG. 5. For example, the millimeter wave repeater 140 may be a layer 1 millimeter wave repeater, an analog millimeter wave repeater 140, and/or the like.

For example, if the millimeter wave repeater 140 receives a millimeter wave signal from the base station 110 via the first antenna array 510-1, the millimeter wave repeater 140 may amplify the signal and transmit the signal via the second antenna array 510-2 (e.g., to the one or more UEs 120). Additionally, or alternatively, if the millimeter wave repeater 140 receives a millimeter wave signal from a UE 120 via the second antenna array 510-2, the millimeter wave repeater 140 may amplify the signal and transmit the signal via the first antenna array 510-1 (e.g., to the base station 110). In this way, the millimeter wave repeater 140 may enhance a coverage area of the base station 110, may permit the base station 110 and obstructed UEs 120 to communicate with one another, and/or the like.

As shown by reference number 640, in some aspects, the millimeter wave repeater 140 may transmit, and the base station 110 may receive, a report regarding one or more sets of antennas (e.g., one or more antenna arrays 510) included in the millimeter wave repeater 140. In some aspects, the base station 110 may determine a configuration for the one or more sets of antennas. For example, the base station 110 may determine the configuration based at least in part on the report. As described in more detail below, the base station 110 may transmit the configuration to the millimeter wave repeater 140. In this way, the base station 110, rather than the millimeter wave repeater 140, may perform the processing to determine the configuration, thereby conserving resources of the millimeter wave repeater 140 and/or reducing a cost to produce the millimeter wave repeater 140.

As described above in connection with FIG. 5, the report, the configuration, and/or other control information may be communicated between the base station 110 and the millimeter wave repeater 140 via a communication interface (e.g., used by the communication component 540) that uses a wireless communication technology other than millimeter wave. For example, the report, the configuration, and/or other control information may be communicated using a PAN technology (e.g., Bluetooth, BLE, and/or the like), a 4G or LTE radio access technology, an NB-IoT technology, a sub-6 GHz technology, a visible light communication technology, an invisible light communication technology, and/the like. This may increase the reliability of communicating control information.

The report may indicate, for example, a capability of the millimeter wave repeater 140 with respect to one or more sets of antennas included in the millimeter wave repeater 140 (e.g., whether one or more sets of antennas are capable of switching between TX and RX, permissible phase values and/or phase offsets for the one or more sets of antennas, permissible angles of coverage for the one or more sets of antennas, permissible power parameters for the one or more sets of antennas, and/or the like), an architecture of the one or more sets of antennas (e.g., connections between sets of antennas, a number and/or arrangement of antenna elements included in a set of antennas, and/or the like), a number of sets of antennas (e.g., a number of antenna arrays 510) included in the millimeter wave repeater 140, a number of antenna elements included in one or more sets of antennas included in the millimeter wave repeater 140 (e.g., a number of antenna elements included in a specific antenna array 510, a number of antenna elements included in each antenna array 510, and/or the like), an arrangement of antenna elements in one or more sets of antennas included in the millimeter wave repeater (e.g., an indication of a number of rows and a number of columns (e.g., M×N) in which the antenna elements are arranged for an antenna array 510), and/or the like.

As shown by reference number 650, the base station 110 may transmit, and the millimeter wave repeater 140 may receive, a configuration for one or more sets of antennas included in the millimeter wave repeater 140. In some aspects, the base station 110 may determine the configuration based at least in part on the report. For example, the base station 110 may use the report to determine one or more configurations supported by the millimeter wave repeater 140, one or more configurations supported by an antenna array 510 of the millimeter wave repeater 140, and/or the like. Additionally, or alternatively, the base station 110 may use the report to select a configuration for the millimeter wave repeater 500, for an antenna array 510 of the millimeter wave repeater 140, and/or the like.

In some aspects, the configuration may indicate a beamforming codebook from which the first beamforming configuration is to be selected. Additionally, or alternatively, the millimeter wave repeater 140 may store the beamforming codebook in memory (e.g., the beamforming codebook may be preconfigured and/or fixed in memory), and may indicate the beamforming codebook to the base station 110. The beamforming codebook may indicate multiple beamforming configurations permitted to be used by the first antenna array 510-1 for communications between the millimeter wave repeater 140 and the base station 110. In some aspects, the base station 110 and/or the millimeter wave repeater 140 may select the first beamforming configuration from the beamforming codebook. Additionally, or alternatively, the base station 110 may determine the first beamforming configuration (e.g., based at least in part on the beamforming codebook), and the configuration may indicate the first beamforming configuration to be used by the millimeter wave repeater 140.

In some aspects, the base station 110 may indicate the first beamforming configuration as a set of beamforming parameters (e.g., from a beamforming codebook) to be used to configure the first antenna array 510, such as one or more phase values, one or more phase offset values, one or more power parameter values, a quasi co-location (QCL) relationship, a transmission configuration indication (TCI) state, and/or the like. Additionally, or alternatively, the millimeter wave repeater 140 may store information (e.g., in a beamforming codebook) that identifies multiple sets of beamforming parameters in association with multiple corresponding index values, and the base station 110 may indicate the first beamforming configuration as an index value that maps to a set of beamforming parameters. In this case, the millimeter wave repeater 140 may use the index value to look up the set of beamforming parameters (e.g., in a table stored by the millimeter wave repeater 140, such as a table of a beamforming codebook) to be used for the first antenna array 510.

Additionally, or alternatively, the configuration may indicate a specific set of antennas, included in the millimeter wave repeater 140, to be used as the first set of antennas (e.g., the first antenna array 510-1) for communications between the millimeter wave repeater 140 and the base station 110 (e.g., to be used for backhaul communications). For example, the report may include an antenna array identifier for each antenna array 510 included in the millimeter wave repeater 140 (e.g., along with characteristics of each antenna array 510), and the base station 110 may indicate an antenna array 510 to be used for backhaul communications with the base station 110 by indicating a specific antenna array identifier to the millimeter wave repeater 140. In some aspects, different antenna arrays 510 may be associated with different beamforming codebooks from which the first beamforming configuration may be selected.

Additionally, or alternatively, the configuration may indicate a specific set of antennas, included in the millimeter wave repeater 140, to be used as the second set of antennas (e.g., the second antenna array 510-2) for communications between the millimeter wave repeater 140 and the one or more UEs 120 (e.g., to be used for access communications), in a similar manner as described above. In some aspects, the millimeter wave repeater 140 may include multiple antenna arrays 510 capable of being used for access communications with UE(s) 120. In some aspects, each of these antenna arrays 510 may be associated with a different fixed beamforming configuration for access communications. In some aspects, the base station 110 indicates the antenna array 510 to be used for access communications, and does not indicate a beamforming configuration for that antenna array 510 because the beamforming configuration may be fixed and/or already stored in memory of the millimeter wave repeater 140. In this way, network resources may be conserved. Additionally, or alternatively, the base station 110 may indicate multiple antenna arrays permitted to be used by the millimeter wave repeater 140 for access communications, and the millimeter wave repeater 140 may select one of the indicated antenna arrays.

In some aspects, when the millimeter wave repeater 140 selects an antenna array (e.g., the first antenna array 510-1, the second antenna array 510-2, and/or the like) and/or a beamforming configuration (e.g., from a beamforming codebook, a fixed beamforming configuration for an antenna array 510, and/or the like), the millimeter wave repeater 140 may indicate the selected antenna array 510 and/or the selected beamforming configuration to the base station 110 (e.g., via the communication component 540).

As shown by reference number 660, the millimeter wave repeater 140 may use the configuration to configure one or more components on the millimeter wave repeater 140 (e.g., using the controller 530 and/or the like). For example, the millimeter wave repeater 140 may configure an antenna array to be used as the first antenna array 510-1, may configure an antenna array to be used as the second antenna array 510-2 (e.g., and/or a corresponding fixed beamforming configuration for the second antenna array 510-2), may configure a first beamforming configuration for the first antenna array 510-1, and/or the like. Based at least in part on such configuration(s), the millimeter wave repeater 140 may communicate with the base station 110 using the first antenna array 510-1 and a first beam configured using the first beamforming configuration. Similarly, the millimeter wave repeater 140 may communicate with one or more UEs 120 using the second antenna array 510-2 and a second beam configured using a fixed beamforming configuration corresponding to the second antenna array 510-2. The millimeter wave repeater 140 may use the first beam (e.g., a backhaul beam) and the second beam (e.g., an access beam) to relay or repeat (e.g., and possibly amplify) communications from the base station 110 to one or more UEs 120 and/or communications from one or more UEs 120 to the base station 110.

Using the techniques and apparatuses described herein, network resources may be conserved, millimeter wave repeater resources (e.g., memory resources, processing resources, battery power, and/or the like) may be conserved, base station resources (e.g., memory resources, processing resources, and/or the like) may be conserved, a production cost of the millimeter wave repeater 140 may be reduced, and/or the like.

As indicated above, FIG. 6 is provided as an example. Other examples may differ from what is described with regard to FIG. 6.

Figure 7:
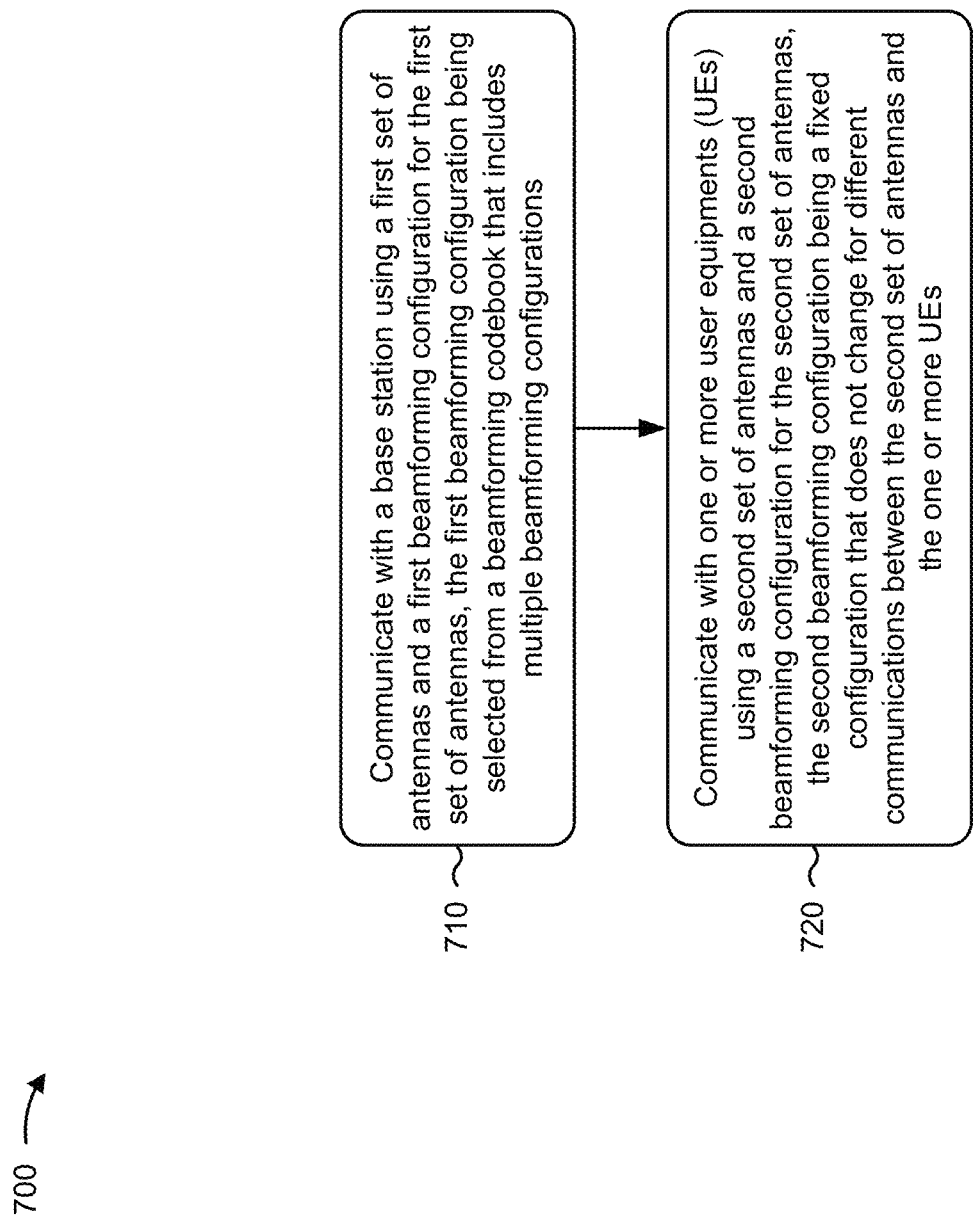
FIGS. 7 and 8 are diagrams illustrating example processes associated with an analog millimeter wave repeater, in accordance with various aspects of the present disclosure.

FIG. 7 is a diagram illustrating an example process 700 performed, for example, by a millimeter wave repeater, in accordance with various aspects of the present disclosure. Example process 700 is an example where a millimeter wave repeater (e.g., millimeter wave repeater 140, millimeter wave repeater 500, and/or the like) performs operations associated with communicating using an analog millimeter wave repeater.

As shown in FIG. 7, in some aspects, process 700 may include communicating with a base station using a first set of antennas and a first beamforming configuration for the first set of antennas, the first beamforming configuration being selected from a beamforming codebook that includes multiple beamforming configurations (block 710). For example, the millimeter wave repeater (e.g., using an antenna array 510, gain component 520, controller 530, and/or the like) may communicate with a base station using a first set of antennas and a first beamforming configuration for the first set of antennas, as described above. In some aspects, the first beamforming configuration may be selected from a beamforming codebook that includes multiple beamforming configurations.

As further shown in FIG. 7, in some aspects, process 700 may include communicating with one or more user equipments (UEs) using a second set of antennas and a second beamforming configuration for the second set of antennas, the second beamforming configuration being a fixed configuration that does not change for different communications between the second set of antennas and the one or more UEs (block 720). For example, the millimeter wave repeater (e.g., using an antenna array 510, gain component 520, controller 530, and/or the like) may communicate with one or more UEs using a second set of antennas and a second beamforming configuration for the second set of antennas, as described above. In some aspects, the second beamforming configuration may be a fixed configuration that does not change for different communications between the second set of antennas and the one or more UEs.

Process 700 may include additional aspects, such as any single aspect and/or any combination of aspects described below and/or in connection with one or more other processes described elsewhere herein.

In a first aspect, process 700 may include receiving an analog millimeter wave signal via one of the first set of antennas or the second set of antennas; amplifying the analog millimeter wave signal without performing analog-to-digital conversion; and transmitting the amplified analog millimeter wave signal via the other of the first set of antennas or the second set of antennas.

In a second aspect, alone or in combination with the first aspect, the millimeter wave repeater is a layer 1 millimeter wave repeater.

In a third aspect, alone or in combination with one or more of the first and second aspects, the second beamforming configuration is not selected from a beamforming codebook, or is selected from a beamforming codebook that includes a single beamforming configuration.

In a fourth aspect, alone or in combination with one or more of the first through third aspects, the first beamforming configuration configures a narrower beam than the second beamforming configuration.

In a fifth aspect, alone or in combination with one or more of the first through fourth aspects, the second beamforming configuration configures a pseudo-omnidirectional beam.

In a sixth aspect, alone or in combination with one or more of the first through fifth aspects, the second set of antennas is selected from multiple sets of antennas, wherein each of the multiple sets of antennas is associated with a different fixed beamforming configuration for communicating with the one or more UEs.

In a seventh aspect, alone or in combination with one or more of the first through sixth aspects, the second set of antennas, to be used to communicate with the one or more UEs, is determined based at least in part on an indication from a base station.

In an eighth aspect, alone or in combination with one or more of the first through seventh aspects, at least one of the first beamforming configuration or the beamforming codebook is determined based at least in part on an indication from a base station.

In a ninth aspect, alone or in combination with one or more of the first through eighth aspects, at least one of the first beamforming configuration or the beamforming codebook is indicated via a communication interface, between the millimeter wave repeater and the base station, that uses a wireless communication technology other than millimeter wave.

In a tenth aspect, alone or in combination with one or more of the first through ninth aspects, the first beamforming configuration is indicated as a set of beamforming parameters or an index value that maps to the set of beamforming parameters.

In an eleventh aspect, alone or in combination with one or more of the first through tenth aspects, at least one of the first beamforming configuration or the beamforming codebook is determined based at least in part on a report transmitted to the base station by the millimeter wave repeater, wherein the report indicates at least one of: a capability of the millimeter wave repeater with respect to multiple sets of antennas included in the millimeter wave repeater, an architecture of the multiple sets of antennas, a number of antenna arrays included in the millimeter wave repeater, a number of antenna elements included in one or more antenna arrays of the millimeter wave repeater, an arrangement of antenna elements in one or more antenna arrays of the millimeter wave repeater, or a combination thereof.

In a twelfth aspect, alone or in combination with one or more of the first through eleventh aspects, the beamforming codebook is preconfigured in memory of the millimeter wave repeater and transmitted to a base station.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
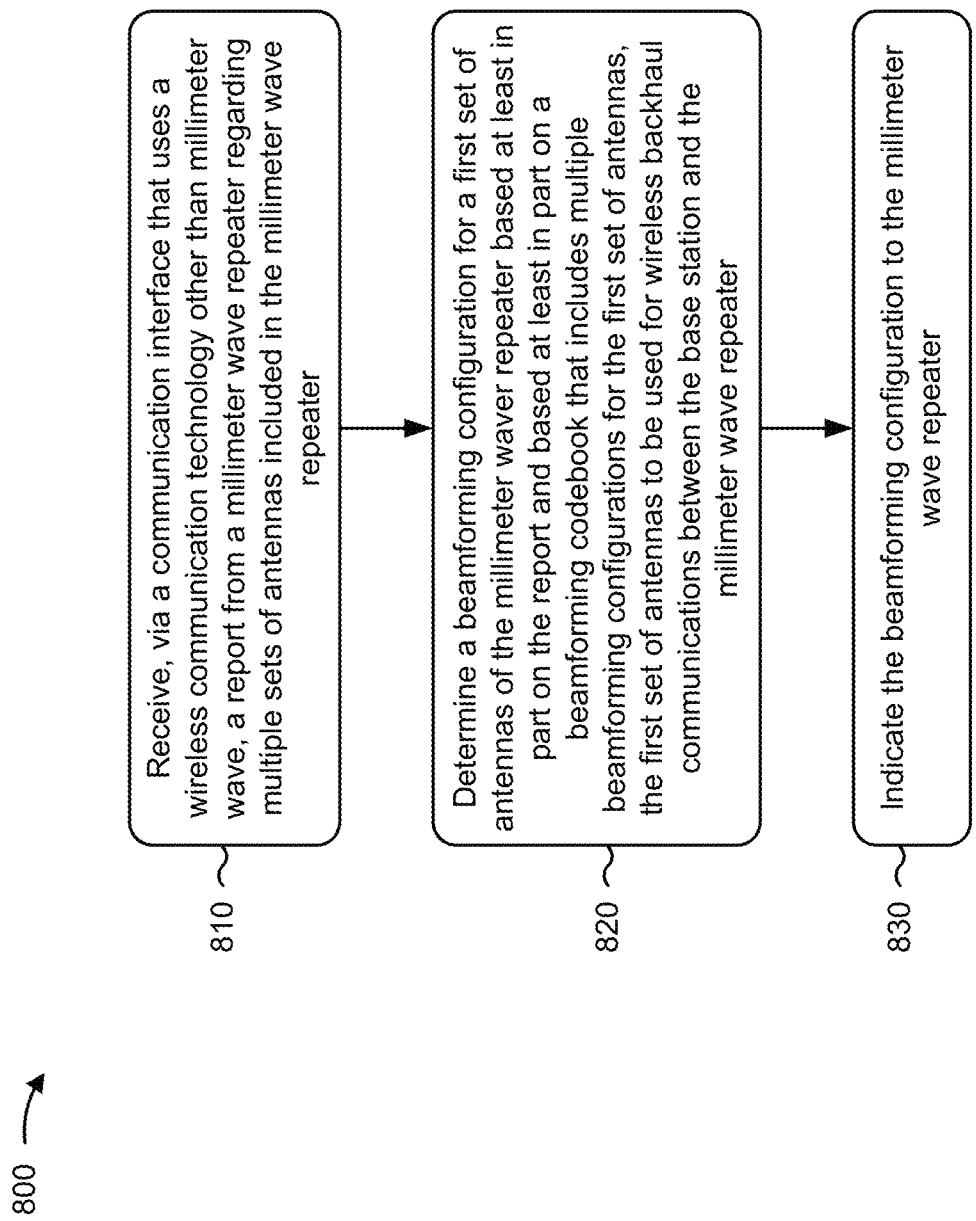

FIG. 8 is a diagram illustrating an example process 800 performed, for example, by a base station, in accordance with various aspects of the present disclosure. Example process 800 is an example where a base station (e.g., base station 110 and/or the like) performs operations associated with communicating using an analog millimeter wave repeater.

As shown in FIG. 8, in some aspects, process 800 may include receiving, via a communication interface that uses a wireless communication technology other than millimeter wave, a report from a millimeter wave repeater regarding multiple sets of antennas included in the millimeter wave repeater (block 810). For example, the base station (e.g., using antenna 234, DEMOD 232, MIMO detector 236, receive processor 238, controller/processor 240, and/or the like) may receive a report from a millimeter wave repeater regarding multiple sets of antennas included in the millimeter wave repeater, as described above. In some aspects, the report may be received via a communication interface that uses a wireless communication technology other than millimeter wave.

As further shown in FIG. 8, in some aspects, process 800 may include determining a beamforming configuration for a first set of antennas of the millimeter wave repeater based at least in part on the report and based at least in part on a beamforming codebook that includes multiple beamforming configurations for the first set of antennas, the first set of antennas to be used for wireless backhaul communications between the base station and the millimeter wave repeater (block 820). For example, the base station (e.g., using controller/processor 240 and/or the like) may determine a beamforming configuration for a first set of antennas of the millimeter wave repeater based at least in part on the report and based at least in part on a beamforming codebook that includes multiple beamforming configurations for the first set of antennas, as described above. In some aspects, the first set of antennas may be used for wireless backhaul communications between the base station and the millimeter wave repeater.

As further shown in FIG. 8, in some aspects, process 800 may include indicating the beamforming configuration to the millimeter wave repeater (block 830). For example, the base station (e.g., using controller/processor 240, transmit processor 220, TX MIMO processor 230, MOD 232, antenna 234, and/or the like) may transmit the beamforming configuration to the millimeter wave repeater, as described above.

Process 800 may include additional aspects, such as any single aspect and/or any combination of aspects described below and/or in connection with one or more other processes described elsewhere herein.

In a first aspect, process 800 may include communicating with the millimeter wave repeater, using a millimeter wave radio access technology, based at least in part on the beamforming configuration.

In a second aspect, alone or in combination with the first aspect, process 800 may include indicating a second set of antennas to be used by the millimeter wave repeater for wireless access communications between the millimeter wave repeater and one or more UEs.

In a third aspect, alone or in combination with one or more of the first and second aspects, the second set of antennas is selected from multiple sets of antennas of the millimeter wave repeater, wherein each of the multiple sets of antennas is associated with a different fixed beamforming configuration for the wireless access communications between the millimeter wave repeater and the one or more UEs.

In a fourth aspect, alone or in combination with one or more of the first through third aspects, the beamforming codebook is determined based at least in part on the report.

In a fifth aspect, alone or in combination with one or more of the first through fourth aspects, the beamforming codebook is indicated to the base station by the millimeter wave repeater.

In a sixth aspect, alone or in combination with one or more of the first through fifth aspects, the beamforming codebook is indicated to the millimeter wave repeater by the base station via the communication interface.

In a seventh aspect, alone or in combination with one or more of the first through sixth aspects, the beamforming configuration is indicated as a set of beamforming parameters or an index value that maps to the set of beamforming parameters.

In an eighth aspect, alone or in combination with one or more of the first through seventh aspects, the report indicates at least one of: a capability of the millimeter wave repeater with respect to multiple sets of antennas included in the millimeter wave repeater, an architecture of the multiple sets of antennas, a number of antenna arrays included in the millimeter wave repeater, a number of antenna elements included in one or more antenna arrays of the millimeter wave repeater, an arrangement of antenna elements in one or more antenna arrays of the millimeter wave repeater, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a millimeter wave repeater, comprising:
   communicating with a base station using a first set of antennas and a first beamforming configuration for the first set of antennas,
      the first beamforming configuration being selected from a beamforming codebook that includes multiple beamforming configurations; and
   communicating with one or more user equipments (UEs) using a second set of antennas and a second beamforming configuration for the second set of antennas,
      the second beamforming configuration being a fixed configuration that does not change for different communications between the second set of antennas and the one or more UEs, and
      the first beamforming configuration, for the first set of antennas used to communicate with the base station, configures a narrower beam than the second beamforming configuration, for the second set of antennas used to communicate with the one or more UEs.

2. The method of claim 1, further comprising:
   receiving an analog millimeter wave signal via one of the first set of antennas or the second set of antennas;
   amplifying the analog millimeter wave signal without performing analog-to-digital conversion; and
   transmitting the amplified analog millimeter wave signal via the other of the first set of antennas or the second set of antennas.

3. The method of claim 1, wherein the millimeter wave repeater is a layer 1 millimeter wave repeater.

4. The method of claim 1, wherein the second beamforming configuration is not selected from a beamforming codebook or is selected from a beamforming codebook that includes a single beamforming configuration.

5. The method of claim 1, wherein the second beamforming configuration configures a pseudo-omnidirectional beam.

6. The method of claim 1, wherein the second set of antennas is selected from multiple sets of antennas, wherein each of the multiple sets of antennas is associated with a different fixed beamforming configuration for communicating with the one or more UEs.

7. The method of claim 1, wherein the second set of antennas, to be used to communicate with the one or more UEs, is determined based at least in part on an indication from a base station.

8. The method of claim 1, wherein at least one of the first beamforming configuration or the beamforming codebook is determined based at least in part on an indication from a base station.

9. The method of claim 8, wherein the at least one of the first beamforming configuration or the beamforming codebook is indicated via a communication interface, between the millimeter wave repeater and the base station, that uses a wireless communication technology other than millimeter wave.

10. The method of claim 8, wherein the first beamforming configuration is indicated as a set of beamforming parameters or an index value that maps to the set of beamforming parameters.

11. The method of claim 8, wherein the at least one of the first beamforming configuration or the beamforming codebook is determined based at least in part on a report indicated to the base station by the millimeter wave repeater, wherein the report indicates at least one of:
   a capability of the millimeter wave repeater with respect to multiple sets of antennas included in the millimeter wave repeater,
   an architecture of the multiple sets of antennas,
   a number of antenna arrays included in the millimeter wave repeater,
   a number of antenna elements included in one or more antenna arrays of the millimeter wave repeater,
   an arrangement of antenna elements in one or more antenna arrays of the millimeter wave repeater, or
   a combination thereof.

12. The method of claim 1, wherein the beamforming codebook is preconfigured in memory of the millimeter wave repeater and indicated to a base station.

13. A method of wireless communication performed by a base station, comprising:
   receiving, via a communication interface that uses a wireless communication technology other than a millimeter wave radio access technology, a report from a millimeter wave repeater regarding multiple sets of antennas included in the millimeter wave repeater;
   determining a beamforming configuration for a first set of antennas of the millimeter wave repeater based at least in part on the report and based at least in part on a beamforming codebook that includes multiple beamforming configurations for the first set of antennas, the first set of antennas to be used for wireless backhaul communications between the base station and the millimeter wave repeater;
   indicating the beamforming configuration to the millimeter wave repeater; and
   communicating with the millimeter wave repeater, using the millimeter wave radio access technology, based at least in part on the beamforming configuration.

14. The method of claim 13, further comprising indicating a second set of antennas to be used by the millimeter wave repeater for wireless access communications between the millimeter wave repeater and one or more user equipments (UEs).

15. The method of claim 14, wherein the second set of antennas is selected from multiple sets of antennas of the millimeter wave repeater, wherein each of the multiple sets of antennas is associated with a different fixed beamforming configuration for the wireless access communications between the millimeter wave repeater and the one or more UEs.

16. The method of claim 13, wherein the beamforming codebook is determined based at least in part on the report.

17. The method of claim 13, wherein the beamforming codebook is indicated to the base station by the millimeter wave repeater.

18. The method of claim 13, wherein the beamforming codebook is indicated to the millimeter wave repeater by the base station via the communication interface.

19. The method of claim 13, wherein the beamforming configuration is indicated as a set of beamforming parameters or an index value that maps to the set of beamforming parameters.

20. The method of claim 13, wherein the report indicates at least one of:
a capability of the millimeter wave repeater with respect to multiple sets of antennas included in the millimeter wave repeater,
an architecture of the multiple sets of antennas,
a number of antenna arrays included in the millimeter wave repeater,
a number of antenna elements included in one or more antenna arrays of the millimeter wave repeater,
an arrangement of antenna elements in one or more antenna arrays of the millimeter wave repeater, or
a combination thereof.

21. A millimeter wave repeater for wireless communication, comprising:
a memory; and
one or more processors operatively coupled to the memory, the memory and the one or more processors configured to:
communicate with a base station using a first set of antennas and a first beamforming configuration for the first set of antennas,
the first beamforming configuration being selected from a beamforming codebook that includes multiple beamforming configurations; and
communicate with one or more user equipments (UEs) using a second set of antennas and a second beamforming configuration for the second set of antennas,
the second beamforming configuration being a fixed configuration that does not change for different communications between the second set of antennas and the one or more UEs, and
the first beamforming configuration, for the first set of antennas used to communicate with the base station, configures a narrower beam than the second beamforming configuration, for the second set of antennas used to communicate with the one or more UEs.

22. The millimeter wave repeater of claim 21, wherein the second beamforming configuration is not selected from a beamforming codebook or is selected from a beamforming codebook that includes a single beamforming configuration.

23. The millimeter wave repeater of claim 21, wherein the second set of antennas is selected from multiple sets of antennas, wherein each of the multiple sets of antennas is associated with a different fixed beamforming configuration for communicating with the one or more UEs.

24. The millimeter wave repeater of claim 21, wherein at least one of the second set of antennas, the first beamforming configuration, or the beamforming codebook is determined based at least in part on an indication from a base station.

25. A base station for wireless communication, comprising:
a memory; and
one or more processors operatively coupled to the memory, the memory and the one or more processors configured to:
receive, via a communication interface that uses a wireless communication technology other than a millimeter wave radio access technology, a report from a millimeter wave repeater regarding multiple sets of antennas included in the millimeter wave repeater;
determine a beamforming configuration for a first set of antennas of the millimeter wave repeater based at least in part on the report and based at least in part on a beamforming codebook that includes multiple beamforming configurations for the first set of antennas, the first set of antennas to be used for wireless backhaul communications between the base station and the millimeter wave repeater;
indicate the beamforming configuration to the millimeter wave repeater; and
communicate with the millimeter wave repeater, using the millimeter wave radio access technology, based at least in part on the beamforming configuration.

26. The base station of claim 25, further comprising indicating a second set of antennas to be used by the millimeter wave repeater for wireless access communications between the millimeter wave repeater and one or more user equipments (UEs).

27. The base station of claim 25, wherein the report indicates at least one of:
a capability of the millimeter wave repeater with respect to multiple sets of antennas included in the millimeter wave repeater,
an architecture of the multiple sets of antennas,
a number of antenna arrays included in the millimeter wave repeater,
a number of antenna elements included in one or more antenna arrays of the millimeter wave repeater,
an arrangement of antenna elements in one or more antenna arrays of the millimeter wave repeater, or
a combination thereof.

28. The base station of claim 25, wherein the beamforming codebook is determined based at least in part on the report.

29. The base station of claim 25, wherein the beamforming codebook is indicated to the base station by the millimeter wave repeater.

30. The base station of claim 25, wherein the beamforming codebook is indicated to the millimeter wave repeater by the base station via the communication interface.

* * * * *